J. LEMLEY.
Guides for Cutting Patterns.
No. 155,322. Patented Sept. 22, 1874.
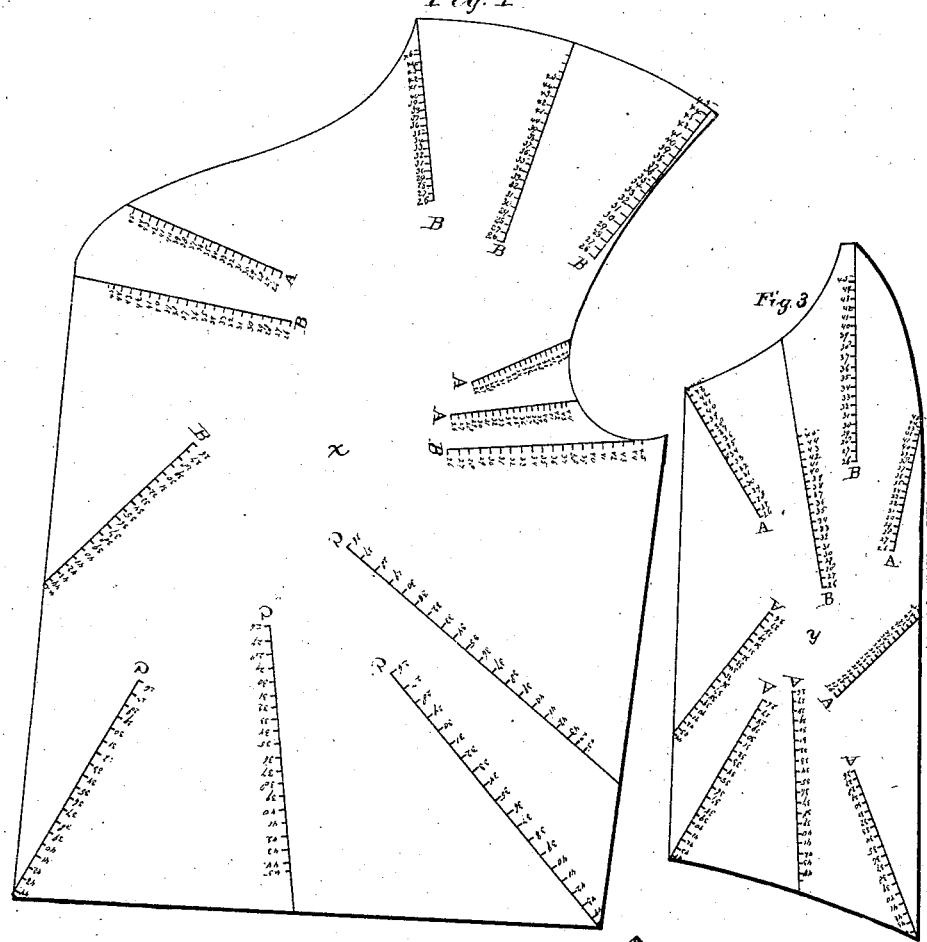
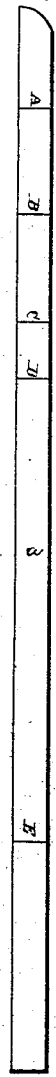
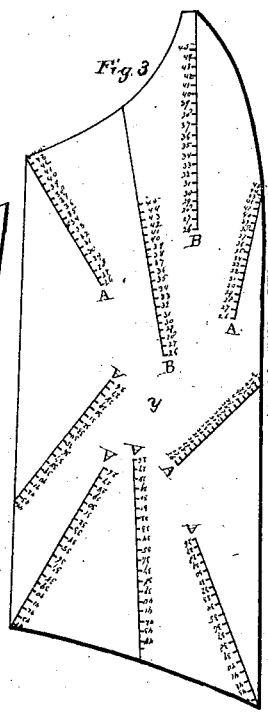
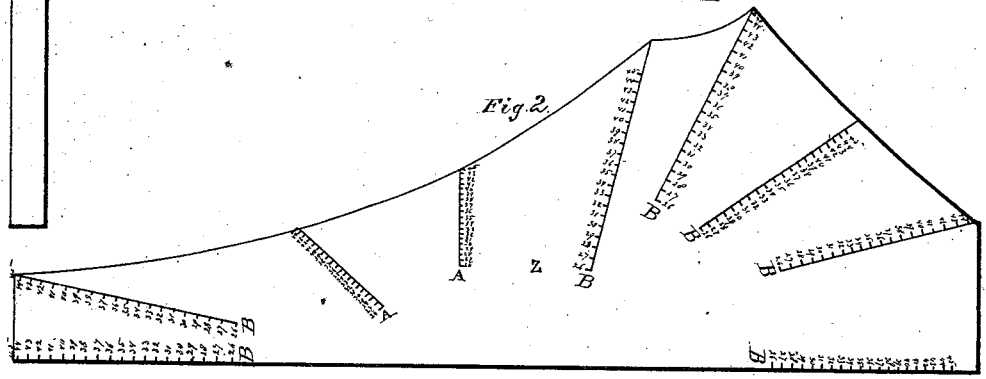
WITNESSES.
INVENTOR.
Jacob Lemley
per
F. A. Lehmann
atty

UNITED STATES PATENT OFFICE.

JACOB LEMLEY, OF NEWTOWN, VIRGINIA.

IMPROVEMENT IN GUIDES FOR CUTTING PATTERNS.

Specification forming part of Letters Patent No. 155,322, dated September 22, 1874; application filed May 23, 1874.

*To all whom it may concern:*

Be it known that I, JACOB LEMLEY, of Newtown, in the county of Frederick and State of Virginia, have invented certain new and useful Improvements in Systems of Cutting Garments; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in the apparatus for cutting garments; and it consists in patterns upon which are drawn a number of lines at different angles, which lines are divided off into regular spaces and numbered. In connection with these lines, each of which is lettered so as to distinguish it, is used a ruler, upon which spaces or distances are lettered, which correspond to the lettered lines on the patterns, all of which will be more fully described hereafter.

The accompanying drawings represent patterns, $x\ y\ z$, for a coat, upon which my system is illustrated.

I take the smallest-sized pattern for the article which I am about to cut, whether coat, vest, dress, or pants, upon which pattern are drawn a number of lines, A B C, as shown, which extend over the face of the pattern at different angles. These lines are divided off into numbers, which run from 26, one size larger than the pattern itself, up to 45. The measures are then taken from the person by means of a tape-line, and the number of inches upon the tape give the key to what figure to measure from on the lines upon the pattern. Upon the rule $a$ are marked off a number of spaces, which run from A up to E, the longest measure to be taken in cutting pants. When a measure is taken upon the body corresponding to one of the lines upon the pattern, the rule is applied to all those lines having the same letter, and the letter on the rule is placed upon the figure on those lines indicated by the tape-line. For instance, the measure is taken around the breast, and the tape gives thirty-six: Letter B on the rule is placed upon 36, line B, and also upon 36, line A, or any other line on the pattern, and then the end of the rule outside of the pattern is marked upon the goods by a small cross.

All the other measures are taken in the same manner, and when completed the pattern is removed, and then the cloth cut from cross to cross.

The great advantages of my system are, that the pattern is never removed from the cloth, after it is once laid down, until the article to be cut is marked out; all the measurements taken come entirely outside of the pattern; the lines all run at different angles, without centering at any one point, so that they can be extended to overlap one another when desired; the system is so simple that it can be readily understood by even a child; a single measurement will answer for any one part of a garment, where a person is regularly formed; and it is adapted to cutting every kind of a garment worn.

Where a person has any irregularities of form about his person, these irregularities will have to be subject to measurements according to circumstances.

Having thus described my invention, I claim—

In combination with the patterns $x\ y\ z$, upon which are drawn a number of spaces and lettered lines running at different angles, the rule $a$, upon which are marked lettered spaces, varying to correspond with the lettered lines, substantially as set forth.

In testimony that I claim the foregoing I have hereunto set my hand this 21st day of May, 1874.

JACOB LEMLEY.

Witnesses:
J. W. RITENOUR,
F. A. LEHMANN.